United States Patent
Heo

(10) Patent No.: US 10,374,290 B2
(45) Date of Patent: Aug. 6, 2019

(54) ANTENNA AND ELECTRONIC DEVICE INCLUDING THE SAME

(71) Applicant: Samsung Electronics Co., Ltd., Gyeonggi-do (KR)

(72) Inventor: Young Heo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 25 days.

(21) Appl. No.: 15/694,261

(22) Filed: Sep. 1, 2017

(65) Prior Publication Data

US 2018/0076507 A1 Mar. 15, 2018

(30) Foreign Application Priority Data

Sep. 12, 2016 (KR) .................. 10-2016-0117031

(51) Int. Cl.
*H01Q 1/24* (2006.01)
*H01Q 9/42* (2006.01)
*H01Q 5/378* (2015.01)
*H01Q 5/321* (2015.01)
*H01Q 1/38* (2006.01)
*H01Q 9/04* (2006.01)
*H04B 1/00* (2006.01)

(52) U.S. Cl.
CPC ............ *H01Q 1/243* (2013.01); *H01Q 5/321* (2015.01); *H01Q 5/378* (2015.01); *H01Q 9/42* (2013.01); *H01Q 1/38* (2013.01); *H01Q 9/0421* (2013.01); *H04B 1/006* (2013.01)

(58) Field of Classification Search
CPC ........ H01Q 1/243; H01Q 5/321; H01Q 5/378; H01Q 9/42; H01Q 9/0421; H04B 1/006
See application file for complete search history.

(56) References Cited

U.S. PATENT DOCUMENTS

| 2013/0249744 | A1* | 9/2013 | Jang | ............... | H01Q 21/30 343/702 |
| 2014/0199950 | A1* | 7/2014 | Ash, Jr. | ........... | H01Q 1/243 455/77 |

(Continued)

FOREIGN PATENT DOCUMENTS

| EP | 3 029 767 | 6/2016 |
| KR | 10-2015-0027682 | 3/2015 |

OTHER PUBLICATIONS

European Search Report dated Jan. 8, 2018 issued in counterpart application No. 17188722.7-1205, 10 pages.

(Continued)

*Primary Examiner* — Dameon E Levi
*Assistant Examiner* — David E Lotter
(74) *Attorney, Agent, or Firm* — The Farrell Law Firm, P.C.

(57) ABSTRACT

An electronic device is provided, which includes a housing; a conductive member forming a part of the housing or disposed on an inside of the housing; a communication circuit electrically connected to a first region of the conductive member; a conductive pattern electrically connected to a second region of the conductive member; and a switching circuit disposed on an electric path between the conductive pattern and the conductive member that controls a switching operation to selectively, electrically connect and disconnect the conductive pattern to and from the conductive member.

14 Claims, 8 Drawing Sheets

(56) References Cited

U.S. PATENT DOCUMENTS

2015/0054701 A1\* 2/2015 Kim .................. H01Q 9/0442
343/750
2016/0018856 A1 1/2016 Heo et al.
2017/0047643 A1\* 2/2017 Zhang .................. H04M 1/02

OTHER PUBLICATIONS

European Search Report dated Oct. 26, 2018 issued in counterpart application No. 17188722.7-1205, 10 pages.

\* cited by examiner

ANTENNA AND ELECTRONIC DEVICE INCLUDING THE SAME

PRIORITY

The present application claims priority under 35 U.S.C. § 119 to Korean Application Serial No. 10-2016-0117031, which was filed in the Korean Intellectual Property Office on Sep. 12, 2016, the entire content of which is incorporated herein by reference.

BACKGROUND

1. Field of the Disclosure

The present disclosure relates generally to an electronic device, and more particularly, to an electronic device including an antenna.

2. Description of the Related Art

Electronic devices are being designed with slimmer bodies, but with increased rigidity and improved designs. As a part of these trends, electronic devices are competing to provide better performance and prevent degradation of radiation performance by efficiently arranging space of at least one antenna that is provided for communication from among their elements.

Antennas used in electronic devices may include inverted-F antennas (IFAs) or monopole emitters, and the volume and the number of antenna emitters mounted in electronic devices may be determined according to a frequency, a bandwidth, and a type of each service. For example, frequencies vary from region to region around the world, but typically, a low band of 700-900 MHz, a mid band of 1700-2100 MHz, and a high band of 2300-2700 MHz are used as a main frequency band. Additionally, various wireless communication services such as Bluetooth (BT), global positioning system (GPS), wireless fidelity (Wi-Fi), etc., may be used.

Electronic devices may use a plurality of antennas to support the above-described communication bands, but when electronic devices are slimmer, there is limited antenna volume space therein. To overcome this problem, service bands having similar frequency bands have been bound and distributed to multiple antennas.

For example, for an antenna responsible for voice/data communication (e.g., general packet radio service (GPRS), wideband code division multiple access (WCDMA), long term evolution (LTE), etc.), which is a main communication function of a terminal, the antenna may be disposed at a lower end of the terminal, where few metal components, which may degrade the performance of the antenna, are installed.

According to European standards, 24 bands (B) in total, such as $2^{nd}$ Generation (2G) (Global System for Mobile Communications (GSM850), Extended GSM (EGSM), Digital Cellular System (DCS), Personal Communications Service (PCS)), WCDMA (B1, B2, B5, B8), and LTE (B1, B2, B3, B4, B5, B7, B8, B12, B17, B18, B19, B20, B26, B38, B39, B40, B41), may be implemented. However, it is difficult to implement all bands in a single antenna while satisfying network operators' specifications and specific absorption rate standard requirements, while minimizing effects on the human body. Therefore, antennas may be implemented by binding services bands having similar frequency bands across at least two regions. For example, one antenna may be designed to implement 2G (GSM850, EGSM, DCS, PCS), WCDMA (B1, B2, B5, B8), and LTE (B1, B2, B3, B4, B5, B8, B12, B17, B18, B19, B20, B26, B39), and another antenna may be designed to implement LTE (B7, B38, B40, B41).

In addition, when the exterior (e.g., a housing) of an electronic device is made of metal (e.g., includes a metal bezel), a metal member may be utilized as an antenna emitter and designed as an antenna, rather than an antenna being separately designed, unlike an injection molding member of a dielectric material.

For example, when at least a part of the housing used as the border of an electronic device is utilized as an antenna emitter, the part may be implemented to operate in a desired frequency band by adjusting an electric length of the antenna from a feeding location by disconnecting a specific location of the metal member by a segment of a dielectric material.

Unit metal members disconnected from each other by a segment may be electrically connected and may be utilized as a multi-band antenna emitter that operates in at least two different frequency bands. In this case, the corresponding unit metal member used as the antenna emitter may be optimized for use in a carrier aggregation (CA) environment (e.g., 2CA, 3CA, 4CA, etc.) or a multi input multi output (MIMO) environment.

However, antennas having the above-described configuration may have a problem that, when a frequency is shifted in a low band (e.g., a frequency is shifted according to a network operator or a region), the operating frequency band of a mid band and/or a high band optimized for use in a desired frequency band is shifted in transmitting and receiving signals, and thus, radiation performance of the antenna emitter is degraded.

SUMMARY

The present disclosure is designed to address at least the problems and/or disadvantages described above and to provide at least the advantages described below.

Accordingly, an aspect of the present disclosure is to provide an antenna and an electronic device including the same.

Another aspect of the present disclosure is to provide an antenna which, even when a frequency shift occurs in a low band, prevents radiation performance degradation of the antenna in advance by avoiding interference in a mid band and/or a high band, and an electronic device including the same.

In accordance with an aspect of the present disclosure, an electronic device is provided, which includes a housing; a conductive member forming a part of the housing or disposed on an inside of the housing; a communication circuit electrically connected to a first region of the conductive member; a conductive pattern electrically connected to a second region of the conductive member; and a switching circuit disposed on an electric path between the conductive pattern and the conductive member that controls a switching operation to selectively, electrically connect and disconnect the conductive pattern to and from the conductive member.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
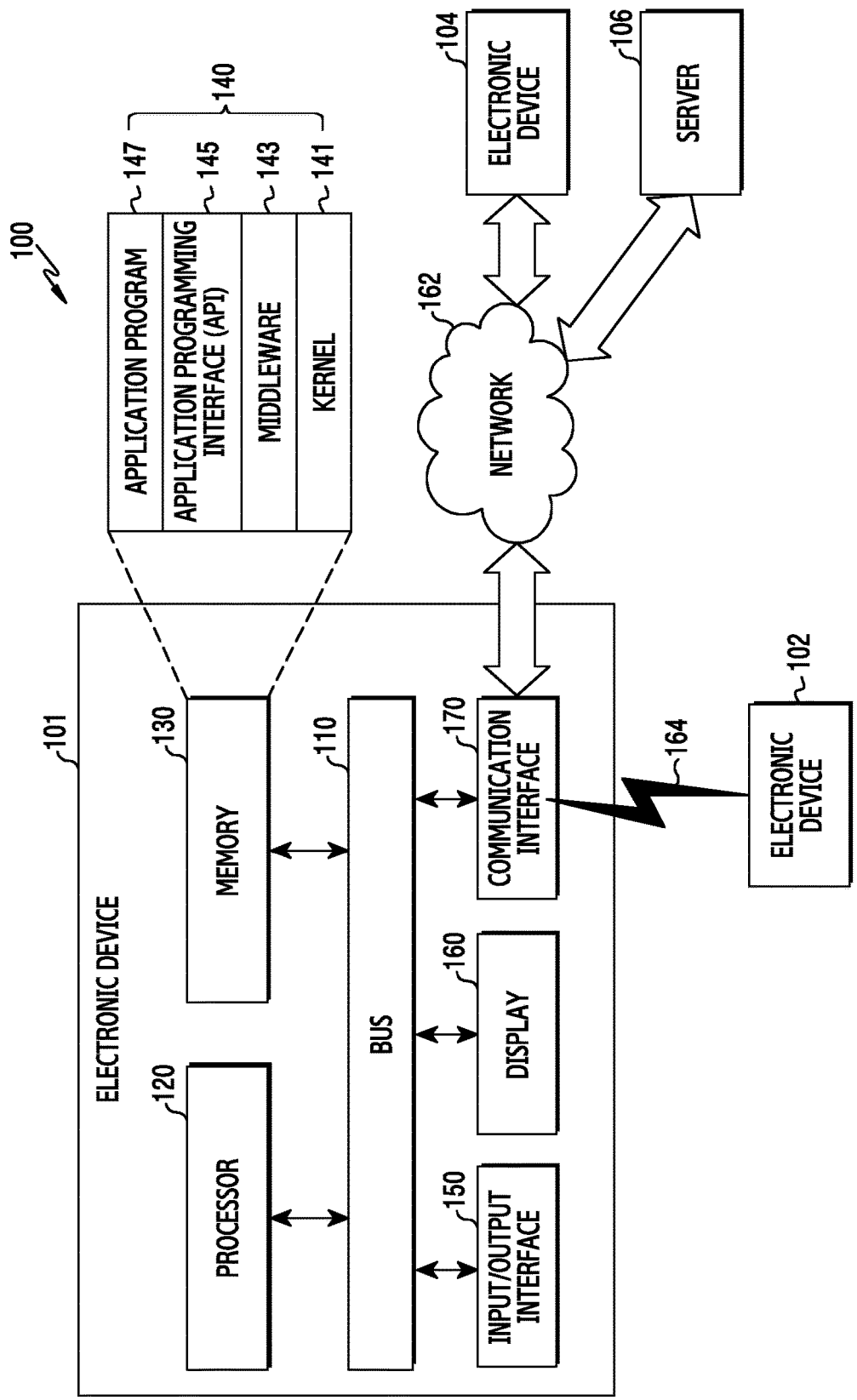
FIG. 1 illustrates a network environment including an electronic device according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. For example, those skilled in the art will understand that the principles of the present disclosure may be implemented in any suitably arranged electronic device.

In addition, descriptions of well-known functions and constructions are omitted for clarity and conciseness.

The terms and words used in the following description and claims are not limited to their dictionary meanings, but are used to convey a clear and consistent understanding of the present disclosure. Accordingly, it should be apparent to those skilled in the art that the following description of embodiments of the present disclosure is provided for illustrative purposes only and not for the purpose of limiting the present disclosure, as defined by the appended claims and their equivalents.

Singular terms such as "a," "an," and "the" include plural references unless the context clearly dictates otherwise. Thus, for example, "a component surface" includes reference to one or more of such surfaces.

Herein, terms such as "have," "may have," "include," and "may include" indicate the presence of corresponding features (e.g., elements such as numerical values, functions, operations, or parts), but do not preclude the presence of additional features.

The terms "A or B," "at least one of A or/and B," and "one or more of A or/and B" include all possible combinations of the enumerated items. For example, "A or B," "at least one of A and B," or "at least one of A or B" means (1) at least one A, (2) at least one B, or (3) at least one A and at least one B.

Numerical terms such as "first" and "second" may modify various elements regardless of an order and/or importance of the elements, and do not limit the elements. These terms may be used for the purpose of distinguishing one element from another element. For example, a first user device and a second user device may indicate different user devices, regardless of the order or importance the devices. Accordingly, a first element may be referred to as a second element, and similarly, a second element may be referred to as a first element, without departing from the scope the present disclosure.

When an element (e.g., a first element) is "(operatively or communicatively) coupled with/to" or "connected to" another element (e.g., a second element), the first element may be directly coupled with/to the second element, or there may be an intervening element (e.g., a third element) between the first element and the second element. However, when the first element is "directly coupled with/to" or "directly connected to" the second element, there is no intervening element therebetween.

Herein, the term "module" may indicate a unit including one of hardware, software, and firmware, or a combination thereof. The term "module" may be interchangeably used with terms, such as unit, logic, logical block, component, and circuit. A module may be a minimum unit of an integrally constituted component or may be a part thereof. A module may be a minimum unit for performing one or more functions or may be a part thereof. A module may be mechanically or electrically implemented. For example, a module may include at least one of an application-specific integrated circuit (ASIC) chip, a field-programmable gate array (FPGA), and a programmable-logic device, which are known or will be developed and which perform certain operations.

All of the terms used herein, including technical or scientific terms, have the same meanings as those generally understood by a person having ordinary skill in the related art unless they are defined otherwise. Terms defined in a generally used dictionary should be interpreted as having the same or similar meanings as the contextual meanings of the relevant technology and should not be interpreted as having ideal or exaggerated meanings unless clearly defined as such herein. Even terms defined in the disclosure should not be interpreted as excluding embodiments of the present disclosure.

Electronic devices may include smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, and/or wearable devices. For example, the wearable devices may include accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), and/or implantable wearable devices (e.g., implantable circuits).

The electronic devices may be smart home appliances, such as televisions (TVs), digital versatile disk (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, and/or electronic picture frames.

The electronic devices may include various medical devices, such as various portable medical measurement devices (e.g., blood glucose meters, heart rate monitors, blood pressure monitors, thermometers, etc.), magnetic resonance angiography (MRA) devices, magnetic resonance imaging (MRI) devices, computed tomography (CT)

devices, scanners, ultrasonic devices, etc., navigation devices, GPS receivers, event data recorders (EDRs), flight data recorders (FDRs), vehicle infotainment devices, electronic equipment for vessels (e.g., navigation systems, gyrocompasses, etc.), avionics, security devices, head units for vehicles, industrial or home robots, automatic teller machines (ATMs), point of sale (POS) devices, and/or Internet of Things (IoT) devices (e.g., light bulbs, sensors, electric or gas meters, sprinkler devices, fire alarms, thermostats, street lamps, toasters, exercise equipment, hot water tanks, heaters, boilers, etc.).

The electronic devices may also include parts of furniture or buildings/structures, electronic boards, electronic signature receiving devices, projectors, or various measuring instruments (e.g., water meters, electricity meters, gas meters, wave meters, etc.).

The electronic devices may be flexible electronic devices.

The electronic devices may be combinations of the above-described devices.

Additionally, the electronic devices are not limited to the above-described devices, and may include new electronic devices according to the development of new technologies.

Herein, the term "user" may refer to a person who uses an electronic device or may refer to a device (e.g., an artificial intelligence (AI) electronic device) which uses an electronic device.

FIG. 1 illustrates a network environment including an electronic device, according to an embodiment of the present disclosure.

Referring to FIG. 1, the network environment includes an electronic device 101, which includes a bus 110, a processor 120, a memory 130, an input/output interface 150, a display 160, and a communication interface 170. Alternatively, the electronic device 101 may omit at least one of the illustrated components and/or include additional components.

The bus 110 may include a circuit for connecting the components and delivering communications such as a control message therebetween.

The processor 120 may include a central processing unit (CPU), an application processor (AP), and/or a communication processor (CP). The processor 120 processes an operation or data on control of and/or communication with another component of the electronic device 101.

The processor 120 may also include a microprocessor or any suitable type of processing circuitry, such as one or more general-purpose processors (e.g., ARM-based processors), a digital signal processor (DSP), a programmable logic device (PLD), an ASIC, a field-programmable gate array (FPGA), a graphical processing unit (GPU), a video card controller, etc. In addition, when a general purpose computer accesses code for implementing the processing shown herein, the execution of the code transforms the general purpose computer into a special purpose computer for executing the processing shown herein.

The processor 120, which can be connected to an LTE network, may determine whether a call is connected over a circuit switched (CS) service network using caller identification information, such as a caller phone number of the CS service network, e.g., a 2G or a 3rd generation (3G) network. For example, the processor 120 receives incoming call information, such as a CS notification message or a paging request message of the CS service network over the LTE network, such as circuit-switched fallback (CSFB). The processor 120 being connected to the LTE network receives incoming call information, such as a paging request message over the CS service network, such as single radio LTE (SRLTE).

When receiving an incoming CS notification message or a paging request message of the CS service network over the LTE network, the processor 120 may obtain caller identification information from the incoming call information. The processor 120 may display the caller identification information on the display 160. The processor 120 may determine whether to connect the call based on input information corresponding to the caller identification information displayed on the display 160. For example, when detecting input information corresponding to an incoming call rejection, through the input/output interface 150, the processor 120 may restrict the voice call connection and maintain the LTE network connection. When detecting input information corresponding to an incoming call acceptance, through the input/output interface 150, the processor 120 may connect the voice call by connecting to the CS service network.

When receiving the incoming CS notification message or a paging request message of the CS service network over the LTE network, the processor 120 may obtain caller identification information from the incoming call information. The processor 120 may determine whether to connect the call by comparing the caller identification information with a reception control list. For example, when the caller identification information is included in a first reception control list, such as a blacklist, the processor 120 may restrict the voice call connection and maintain the connection to the LTE network. When the caller identification information is not included in the blacklist, the processor 120 may connect the voice call by connecting to the CS service network. When the caller identification information is included in a second reception control list, such as a white list, the processor 120 may connect the voice call by connecting to the CS service network.

When receiving the incoming call information, such as a paging request message of the CS service network over the LTE network, the processor 120 may send an incoming call response message, such as a paging response message, to the CS service network. The processor 120 may suspend the LTE service and receive the caller identification information, such as a circuit-switched call (CC) setup message, from the CS service network. The processor 120 may determine whether to connect the call by comparing the caller identification information with the reception control list. For example, when the caller identification information is included in the blacklist, the processor 120 restricts the voice call connection and resumes the LTE network connection. When the caller identification information is not included in the blacklist, the processor 120 may connect the voice call by connecting to the CS service network. For example, when the caller identification information is included in the white list, the processor 120 connects the voice call by connecting to the CS service network.

The memory 130 may include volatile and/or nonvolatile memory. The memory 130 may store commands or data, such as the reception control list relating to at least another component of the electronic device 101. The memory 130 may store software and/or a program 140. The program 140 includes a kernel 141, middleware 143, an application programming interface (API) 145, and/or application programs (or applications) 147. At least some of the kernel 141, the middleware 143, and the API 145 may be referred to as an operating system (OS).

The kernel 141 may control or manage system resources, such as the bus 110, the processor 120, or the memory 130 used for performing an operation or function implemented by the other programs, such as the middleware 143, the API 145, or the applications 147. Further, the kernel 141 may provide an interface through which the middleware 143, the API 145, or the applications 147 connects the individual elements of the electronic device 101 to control or manage the system resources.

The middleware 143 may function as an intermediary for the API 145 or the applications 147 to communicate with the kernel 141, e.g., to exchange data.

In addition, the middleware 143 may process one or more task requests received from the applications 147 according to priorities thereof. For example, the middleware 143 assigns priorities for using the system resources of the electronic device 101, to at least one of the applications 147. As another example, the middleware 143 performs scheduling or load balancing on the one or more task requests by processing the one or more task requests according to the priorities assigned thereto.

The API 145 is an interface through which the applications 147 may control functions provided from the kernel 141 or the middleware 143, and may include at least one interface or function, such as an instruction for file control, window control, image processing, or text control.

The input/output interface 150 may function as an interface that transfers instructions or data input from a user or another external device to the other element(s) of the electronic device 101. Further, the input/output interface 150 may output the instructions or data received from the other element(s) of the electronic device 101 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 may display various types of content, such as text, images, videos, icons, or symbols. The display 160 may display a web page.

The display 160 may include a touch screen, which receives a touch, a gesture, proximity, a hovering input, etc., using an electronic pen or a user's body part (e.g., a finger).

The communication interface 170 may establish communication between the electronic device 101 and a first external electronic device 102, a second external electronic device 104, and/or a server 106. For example, the communication interface 170 communicates with the first external electronic device 102, the second external electronic device 104, and/or the server 106 through the network 162 using wireless communication or wired communication or via a short-range communication 164. For example, the wireless communication conforms to a cellular communication protocol including at least one of LTE, LTE-advanced (LTE-A), code division multiple access (CDMA), WCDMA, universal mobile telecommunication system (UMTS), wireless broadband (WiBro), and GSM.

The wired communication may include at least one of a universal serial bus (USB), a high definition multimedia interface (HDMI), a recommended standard 232 (RS-232), and a plain old telephone service (POTS).

The network 162 may include a telecommunications network, a computer network such as local area network (LAN) or wide area network (WAN), the Internet, and a telephone network.

The electronic device 101 may provide an LTE service in a single radio environment by use of at least one module functionally or physically separated from the processor 120.

Each of the first and second external electronic devices 102 and 104 may be the same or different type of device as the electronic device 101.

The server 106 may include a group of one or more servers.

All or some of the operations to be executed by the electronic device 101 may be executed by the first external electronic device 102, the second external electronic device 104, and/or the server 106. For example, when the electronic device 101 performs a certain function or service (automatically or by request), the electronic device 101 may request some functions that are associated therewith from the first external electronic device 102, the second external electronic device 104, and/or the server 106, instead of or in addition to executing the function or service itself. The first external electronic device 102, the second external electronic device 104, and/or the server 106 may execute the requested functions or additional functions, and may transmit the results to the electronic device 101. The electronic device 101 may provide the requested functions or services by processing the received results. For example, a cloud computing technique, a distributed computing technique, or a client-server computing technique may be used.

Figure 2:
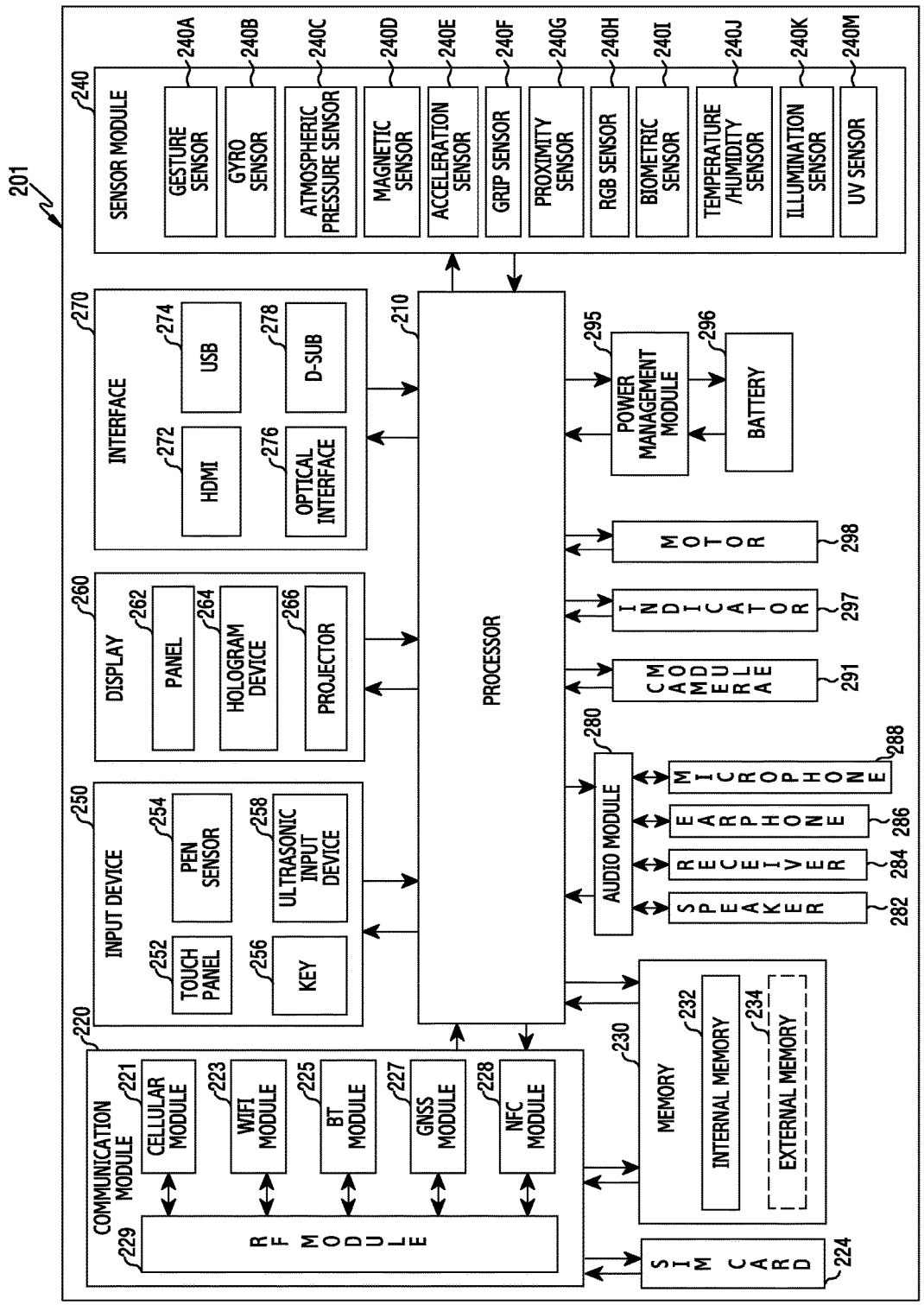
FIG. 2 illustrates an electronic device according to an embodiment of the present disclosure.

FIG. 2 illustrates an electronic device, according to an embodiment of the present disclosure.

Referring to FIG. 2, the electronic device 201 includes a processor 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected to the processor 210 by driving an OS or an application program. The processor 210 may process a variety of data, including multimedia data, perform arithmetic operations, may be implemented with a system on chip (SoC), and may further include a GPU.

The communication module 220 may perform data transmission/reception between an external electronic device and/or a server, which may be connected with the electronic device through a network. The communication module 220 includes a cellular module 221, a Wi-Fi module 223, a Bluetooth® (BT) module 225, a global navigation satellite system (GNSS) or GPS module 227, a near field communication (NFC) module 228, and a radio frequency (RF) module 229.

The cellular module 221 may provide a voice call, a video call, a text service, or an Internet service through a communication network, such as LTE, LTE-A, CDMA, WCDMA, UMTS, WiBro, or GSM. In addition, the cellular module 221 may identify and authenticate the electronic device within the communication network by using the SIM card 224. The cellular module 221 may perform at least some of the functions that can be provided by the processor 210. For example, the cellular module 221 may perform multimedia control functions.

The cellular module 221 may include a CP. Further, the cellular module 221 may be implemented, for example, with an SoC.

Although elements, such as the cellular module 221, the memory 230, and the power management module 295 are illustrated as separate elements with respect to the processor 210 in FIG. 2, the processor 210 may also be implemented such that at least one part of the aforementioned elements, e.g., the cellular module 221, is included in the processor 210.

The processor 210 or the cellular module 221 may load an instruction or data, which is received from each non-volatile memory connected thereto or at least one of different elements, to a volatile memory and processes the instruction or data. In addition, the processor 210 or the cellular module 221 may store data, which is received from at least one of different elements or generated by at least one of different elements, into a non-volatile memory.

Each of the Wi-Fi module 223, the BT module 225, the GNSS module 227, and the NFC module 228 may include a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least two of the cellular module 221, the Wi-Fi module 223, the BT module 225, the GNSS module 227, and the NFC module 228 may be included in one integrated chip (IC) or IC package. For example, at least some of processors corresponding to the cellular module 221, the Wi-Fi module 223, the BT module 225, the GNSS module 227, and the NFC module 228, such as a communication processor corresponding to the cellular module 221 and a Wi-Fi processor corresponding to the Wi-Fi module 223, may be implemented with an SoC.

The RF module 229 may transmit/receive data, such as an RF signal, and may include a transceiver, a power amp module (PAM), a frequency filter, or a low noise amplifier (LNA). In addition, the RF module 229 may further include a component for transmitting/receiving a radio wave on a free space in wireless communication, e.g., a conductor or a conducting wire. The cellular module 221, the Wi-Fi module 223, the BT module 225, the GNSS module 227, and the NFC module 228 may share the RF module 229, or at least one of these modules may transmit/receive an RF signal via a separate RF module.

The SIM card 224 may be inserted into a slot formed in the electronic device. The SIM card 224 includes unique identification information, such as an integrated circuit card identifier (ICCID) or subscriber information, such as an international mobile subscriber identity (IMSI).

The memory 230 includes an internal memory 232 and an external memory 234.

The internal memory 232 may include at least one of a volatile memory, such as a dynamic random access memory (DRAM), a static RAM (SRAM), or a synchronous dynamic RAM (SDRAM) or a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. The internal memory 232 may be a solid state drive (SSD).

The external memory 234 may include a flash drive, a compact flash (CF), secure digital (SD), micro-SD, mini-SD, extreme digital (xD), and a memory stick, and may be operatively coupled to the electronic device via various interfaces.

The electronic device may also include a storage unit (or a storage medium), such as a hard drive.

The sensor module 240 may measure a physical quantity or detect an operation state of the electronic device, and convert the measured or detected information into an electric signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, e.g., a red, green, blue (RGB) sensor, a biometric sensor 240I, a temperature/humidity sensor 240J, an illumination sensor 240K, and an ultraviolet (UV) sensor 240M.

Additionally or alternatively, the sensor module 240 may include other sensors, e.g., an E-node sensor, an electromyography (EMG) sensor, an electroencephalogram (EEG) sensor, an electrocardiogram (ECG) sensor, and/or a fingerprint sensor.

The sensor module 240 may further include a control circuit for controlling at least one or more sensors included therein.

The input device 250 includes a touch panel 252, a (digital) pen sensor 254, a key 256, and an ultrasonic input unit 258.

The touch panel 252 may recognize a touch input by using at least one of an electrostatic type configuration, a pressure-sensitive type configuration, and an ultrasonic type configuration. The touch panel 252 may further include a control circuit. When the touch panel is of the electrostatic type, both physical contact recognition and proximity recognition are possible. The touch panel 252 may further include a tactile layer, which provides the user with a tactile reaction.

The (digital) pen sensor 254 may include a recognition sheet which can be a part of the touch panel or can be separately implemented from the touch panel. The (digital) pen sensor 254 may be implemented using the same or similar method of receiving a touch input of a user or using an additional recognition sheet.

The key 256 may include a physical button, an optical key, or a keypad.

The ultrasonic input device 258 may detect ultrasonic waves generated by an input tool through a microphone 288, and may confirm data corresponding to the detected ultrasonic waves.

The ultrasonic input unit 258 may detect a reflected sound wave through the microphone 288 and perform radio recognition. For example, an ultrasonic signal, which may be generated by using a pen, may be reflected off an object and detected by the microphone 288.

The electronic device may use the communication module 220 to receive a user input from an external device, such as a computer or a server connected thereto.

The display 260 includes a panel 262, a hologram device 264, and a projector 266.

The panel 262 may be an LCD or an AM-OLED and may be implemented in a flexible, transparent, or wearable manner. Alternatively, the panel 262 may be constructed as one module with the touch panel 252.

The hologram device 264 uses an interference of light and displays a stereoscopic image in the air.

The projector 266 displays an image by projecting a light beam onto a screen, which may be located inside or outside the electronic device.

The display 260 may further include a control circuit for controlling the panel 262, the hologram device 264, and/or the projector 266.

The interface 270 includes an HDMI 272, a USB 274, an optical communication interface 276, and a d-subminiature (D-sub) 278. The interface 270 may include a mobile high-definition link (MHL), SD/multi-media card (MMC), and/or infrared data association (IrDA).

The audio module 280 bilaterally converts a sound and an electric signal. The audio module 280 converts sound information, which is input or output through a speaker 282, a receiver 284, an earphone 286, and/or the microphone 288.

The speaker 282 may output a signal of an audible frequency band and a signal of an ultrasonic frequency band. Reflected waves of an ultrasonic signal emitted from the speaker 282 and a signal of an external audible frequency band may be received.

The camera module 291 captures an image and/or a video, and may include one or more image sensors, such as a front sensor or a rear sensor, a lens, an image signal processor (ISP), or a flash, such as an LED or a xenon lamp. Alternatively, the electronic device may include two or more camera modules.

The power management module 295 manages power of the electronic device. The power management module 295 may include a power management integrated circuit (PMIC), a charger IC, and/or a battery gauge.

The PMIC may be included in an IC or an SoC semiconductor and may use a wired charging and/or a wireless charging method. The charger IC may charge the battery 296 and may prevent an over-voltage or over-current flow.

Different types of wireless charging may include magnetic resonance type, magnetic induction type, and electromagnetic type. An additional circuit for the wireless charging, such as a coil loop, a resonant circuit, and/or a rectifier may be added.

The battery gauge may measure a residual quantity of the battery 296 and a voltage, current, and temperature during charging. The battery 296 stores or generates electricity and supplies power to the electronic device by using the stored or generated electricity. The battery 296 may include a rechargeable battery or a solar battery.

The indicator 297 indicates a specific state, such as a booting state, a message, or a charging state of the electronic device or a part thereof, such as the processor 210.

The motor 298 converts an electric signal into a mechanical vibration.

Alternatively, the electronic device includes a processing unit, such as a GPU, for supporting mobile TV, which processes media data according to a protocol, e.g., digital multimedia broadcasting (DMB), digital video broadcasting (DVB), and/or media flow.

Each of the aforementioned elements of the electronic device may include one or more components, and the names thereof may vary depending on a type of the electronic device. Some of the elements illustrated in FIG. 2 may be omitted, and/or additional elements may be included therein. In addition, some of the elements of the electronic device may be combined and constructed as one entity, so as to equally perform functions of corresponding elements before combination.

At least some parts of the electronic device, such as modules or functions thereof, or operations, may be implemented with an instruction stored in a non-transitory computer-readable storage media. The instruction may be executed by the processor 210, to perform a function corresponding to the instruction. The non-transitory computer-readable storage media may be the memory 230. At least some parts of the programming module may be executed by the processor 210. At least some parts of the programming module may include modules, programs, routines, and a set of instructions for performing one or more functions.

Figure 3:
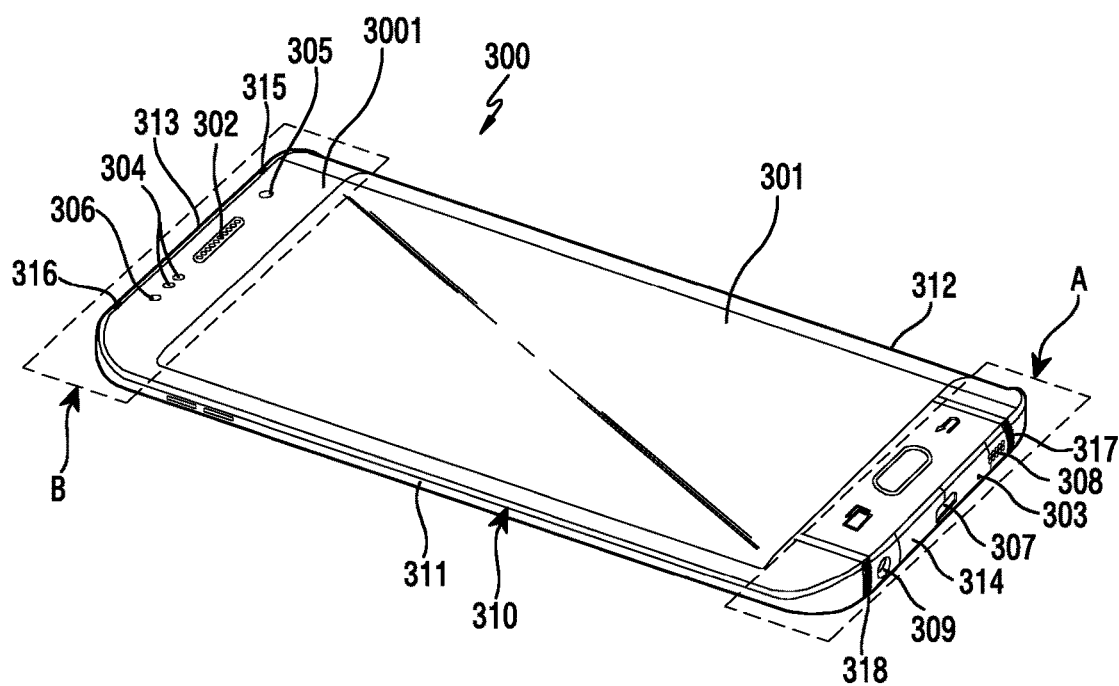
FIG. 3 illustrates an electronic device according to an embodiment of the present disclosure.

FIG. 3 illustrates an electronic device according to an embodiment of the present disclosure.

Referring to FIG. 3, a display 301 is installed on a front surface 3001 (e.g., a first surface) of the electronic device 300. A speaker 302 is installed at an upper side of the display 301 to output a voice received from a connect device. A microphone 303 is installed at a lower side of the display 301 to transmit a voice of a user of the electronic device to the other side. The display 301 may include a touch screen including a touch sensor. The display 301 may include a pressure reaction type touch screen including a touch sensor and a force sensor which reacts to a touch pressure.

The electronic device includes components installed on the periphery of the speaker 302 to perform various functions of the electronic device. The components include a sensor module 304, e.g., at least one of an illuminance sensor (i.e., a light sensor), a proximity sensor, an infrared sensor, an ultrasonic sensor, and an iris scan sensor. The components include a camera 305 and an indicator 306 (e.g., an LED indicator), which may notify the user of state information of the electronic device.

An interface connector port 307 for accommodating an external interface connector (e.g., a B type USB connector, a C type USB connector, etc.), and an ear jack hole 309 for accommodating an ear jack are included at one side of the microphone 303. Another speaker 308 is disposed at the other side of the microphone 303.

The electronic device may include a housing 310 made of metal (e.g., a metal bezel). At least a part of the housing 310 is disposed along the border of the electronic device, and extends to at least a region of a rear surface (e.g., a second surface) of the electronic device extending from the border. The housing 310 may be defined by a thickness of a side surface of the electronic device formed along the border, and may be formed in a loop shape, e.g., a loop shape having a part opened or a completely closed loop shape. However, the housing 310 may also be formed in such a manner that it contributes to at least a part of the thickness of the electronic device.

The housing 310 may be disposed only on at least a region of the border of the electronic device. The housing 310 includes segments 315, 316, 317, and 318 (i.e., nonmetal segments). Unit conductive members, which are segmented by the segments 315, 316, 317, and 318, may be utilized as antenna emitters operating in at least one frequency band. The segments 315, 316, 317, and 318 may be formed of a nonmetal material and may be formed as a part of the housing by performing insert molding or double injection molding on the housing 310 of the metal material.

The housing 310 may be formed along the border in the loop shape, and may be disposed in such a manner that it contributes to an entirety or a part of thickness of the electronic device. The housing 310 of the electronic device includes a first conductive member 311, a second conductive member 312, a third conductive member 313, and a fourth conductive member 314, which are respectively formed on the left, right, top, and bottom of the electronic device, when viewed from the front surface.

At least a part of the fourth conductive member 314 may be configured as a unit conductive member, which is formed by a pair of nonmetal segments 317 and 318, which are spaced apart from each other by a predetermined distance, and may be used as an antenna emitter. The fourth conductive member 314 may serve as an antenna emitter operating in at least two operating frequency bands according to a feeding location.

The first conductive member 311, the second conductive member 312, and/or the third conductive member 313 may have similar or same configurations to or as the above-described fourth conductive member 314, and may be used as antenna emitters.

The electronic device may use the fourth conductive member 314, which is segmented by segments 317 and 318 as an antenna emitter (A region of FIG. 3), and may use the third conductive member 313 segmented by the segments 315 and 316 as an antenna emitter (B region of FIG. 3). However, this should not be considered as limiting.

When segments are formed on the first conductive member 311 and/or the second conductive member 312, the third conductive member 313 and/or the fourth conductive member 314 may include at least a part of the first conductive member 311 and/or the second conductive member 312 and may be used as an antenna emitter.

The fourth conductive member 314 may include a multi-band antenna emitter operating in a low band (e.g., an operating frequency band ranging from 700 MHz to 900 MHz) and a mid band (e.g., an operating frequency band ranging from 1700 MHz to 2100 MHz).

The fourth conductive member 314 may include a multi-band antenna emitter operating in a low band and a high band (e.g., an operating frequency band ranging from 2300 MHz to 2700 MHz).

The electronic device may include a conductive pattern (e.g., a conductive pattern 420 of FIG. 4) of a predetermined shape inside the housing 310. The operating frequency band of the low band may be shifted by shorting the fourth conductive member 314 with the conductive pattern or opening the fourth conductive member 314 according to a switching operation of a switching circuit (e.g., a switching circuit 421 of FIG. 4) disposed in an electric path electrically connecting the conductive pattern and the fourth conductive member 314. In this case, when the operating frequency band of the low band is shifted according to the switching operation of the switching circuit, interference in the mid band and/or high band operating together (e.g., a phenomenon that an operating frequency band is arbitrarily shifted) can be avoided by defining a connection location between the conductive pattern and the fourth conductive member 314.

Figure 4:
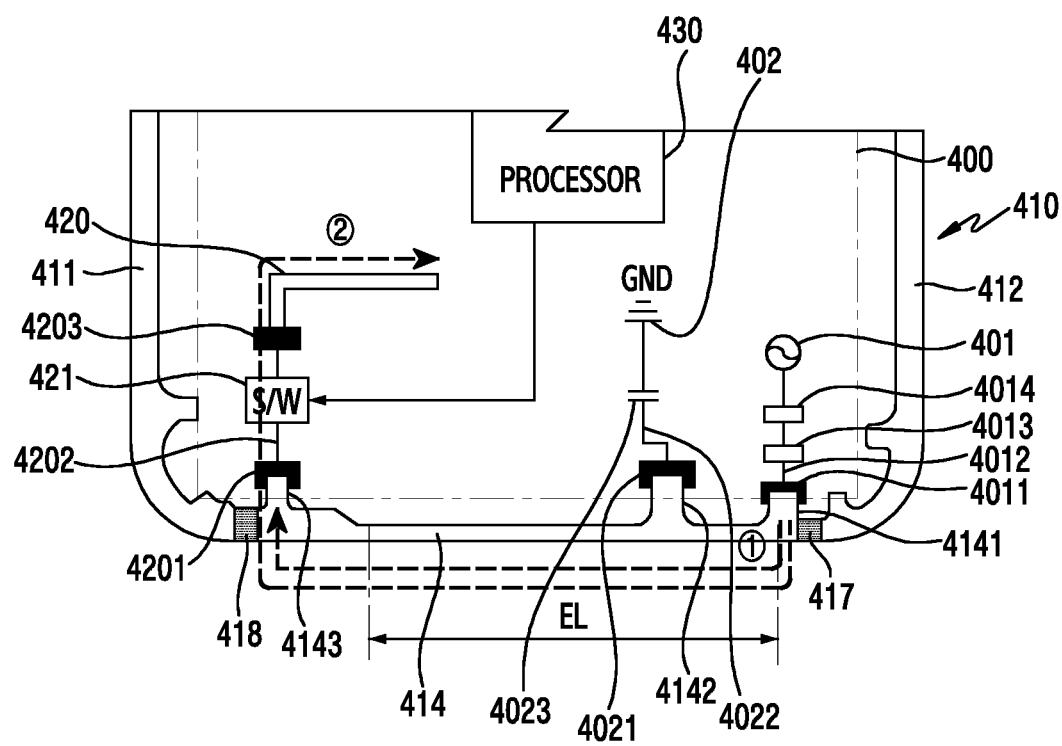
FIG. 4 illustrates an antenna configuration according to an embodiment of the present disclosure.

FIG. 4 illustrates an antenna configuration according to an embodiment of the present disclosure.

Referring to FIG. 4, a housing 410 includes a left conductive member 411, a right conductive member 412, and a lower conductive member 414, viewed from the front surface. For ease of explanation, an upper conductive member is omitted from FIG. 4.

The lower conductive member 414 is separated from the left conductive member 414 and the right conductive member 412 by segments 417 and 418, which are spaced apart from each other by a predetermined distance. The segments 417 and 418 may be formed of a dielectric material. The segments 417 and 418 may be formed by injecting a synthetic resin into the housing 410 of a metal material according to double injection molding or insert molding. However, these examples should not be considered as limiting, and the segments 417 and 418 may be made of various materials having an insulating property.

The lower conductive member 414 includes a feeding piece 4141 protruding toward the inside of the housing. The feeding piece 4141 may be integrally formed with the lower conductive member 414. The feeding piece 4141 may be supplied with power by a feeder 401 (e.g., a communication circuit) of a substrate (e.g., a printed circuit board (PCB)) 400. The feeding piece 4141 of the lower conductive member 414 may be electrically connected with the feeder 401 of the substrate 400 simply by installing the substrate 400 in the electronic device, or may be electrically connected by a separate electric connection member (e.g., a C clip).

A feeding pad 4011 is disposed on the substrate 400, and the feeding pad 4011 may be electrically connected with the feeding piece 4141 of the lower conductive member 414. A first electric path (e.g., a distribution line) 4012 is formed from the feeding pad 4011 to the feeder 401. Because the feeding pad 4011 of the substrate 400 is configured to be electrically in direct contact with the housing 410 forming the exterior of the electronic device, an electric shock prevention circuit 4013 for preventing an electric shock and discharging static electricity (electro-static discharge (ESD)), and a matching circuit 4014 for tuning an antenna emitter to a desired frequency band are further be included on the first electric path 4012.

The lower conductive member 414 includes a ground piece 4142, which is spaced apart from the feeding piece 4141 by a predetermined distance and is integrally formed with the lower conductive member 414. The ground piece 4142 may be electrically connected to a ground 402 of the PCB 400. The ground piece 4142 of the lower conductive member 414 may be electrically connected to the ground 402 of the substrate 400 simply by installing the substrate 400 in the electronic device, or may be electrically connected by a separate electric connection member (e.g., a C clip).

A ground pad 4021 is disposed on the substrate 400, and may be electrically connected with the ground piece 4142 of the lower conductive member 414. A second electric path (e.g., a distribution line) 4022 is formed from the ground pad 4021 to the ground 402. Because the ground pad 4021 of the substrate 400 is configured to be electrically in direct contact with the housing 410 forming the exterior of the electronic device, an electric shock prevention circuit 4023 (e.g., a capacitor) for preventing an ESD is included in the second electric path 4022.

The lower conductive member 414 includes a connection piece 4143 formed inwardly at an end opposite to the feeding piece 4141. The feeding piece 4141 is disposed in the proximity of one end (i.e., in the proximity of the first segment 417) of the lower conductive member 414 segmented into unit conductive members, and the connection piece 4143 is disposed in the proximity of the other end (e.g., in the proximity of the second segment 418) of the lower conductive member 414 segmented into unit conductive members.

A connection pad 4201 is disposed on the substrate 400, and may be electrically connected with the connection piece 4143 simply by installing the substrate 400 in the housing 410. However, this should not be considered as limiting, and the connection pad 4201 and the connection piece 4143 may be electrically connected with each other by a separate electric connection member (e.g., a C clip).

The substrate 400 includes a conductive pattern 420 formed in a predetermined shape. A pattern connection pad 4203 disposed at one end of the conductive pattern 420 is electrically connected with the connection pad 4201 through a third electric path 4202 (e.g., a distribution line) arranged on the substrate 400. Due to this configuration, one end of the lower conductive member 414 may be electrically connected with the conductive pattern 420.

A switching circuit 421 is disposed on the third electric path 4202. The switching circuit 421 may be configured to selectively and electrically connect the conductive pattern 420 and the lower conductive member 414 through control of a processor 430 of the electronic device. The switching circuit 421 may include a single pole, single throw (SPST) switch or a single pole, double throw (SPDT) switch.

The processor 430 of the electronic device may detect state information (e.g., geographical information) of the electronic device through at least one sensor, and may control the switching circuit 421 based on the detected state information. The processor 430 may shift an operating frequency band of a low band by adjusting an electric length of the lower conductive member 414, which is used as an antenna emitter, by selectively switching the lower conductive member 414 and the conductive pattern 420 by controlling the switching circuit 421. For example, the processor 430 may induce the electronic device to operate in a first mid band (e.g., 800 MHz) by opening the lower conductive member 414 and the conductive pattern 420 by controlling the switching circuit 421. The processor 430 may shift to a second mid band (e.g., 7000 MHz) and induce the electronic device to operate in the second mid band by shorting the lower conductive member 414 and the conductive pattern 420 by controlling the switching circuit 421.

The lower conductive member 414 includes an electric radiation path (a region ① of FIG. 4), which is grounded to the ground 402 through the feeding piece 4141 and the ground pad 4021 of the lower conductive member 414, when the lower conductive member 414 is opened by the switching circuit 421. The lower conductive member 414 includes an electric radiation path (a region ② of FIG. 4), which is grounded to the ground 402 through the feeding piece 4141, the lower conductive member 414, the conductive pattern 420, and the ground pad 4021, when the lower conductive member 414 is shorted by the switching circuit 421.

The lower conductive member 414 may be utilized as a multi-band antenna emitter operating in the low band and the mid band and/or high band. In the lower conductive member 414, the operating frequency band of the mid band and/or high band should not be shifted even if the operating frequency band of the low band is shifted by the switching operation of the above-described switching circuit 421. Accordingly, the connection piece 4143 of the lower conductive member 414 electrically connected with the connection pad 4201 may be disposed outside a region of the electric length (EL) (e.g., λ/4, herein the λ is the wavelength) of the lower conductive member 414 used as the antenna emitter. The connection piece 4143 is disposed outside the EL of the lower conductive member 414, such that the operating frequency of the mid band and/or high band are not influenced when the operating frequency of the low band is shifted, and as a result, the lower conductive member 414 may maintain a smooth radiation operation in all bands.

Figure 5:
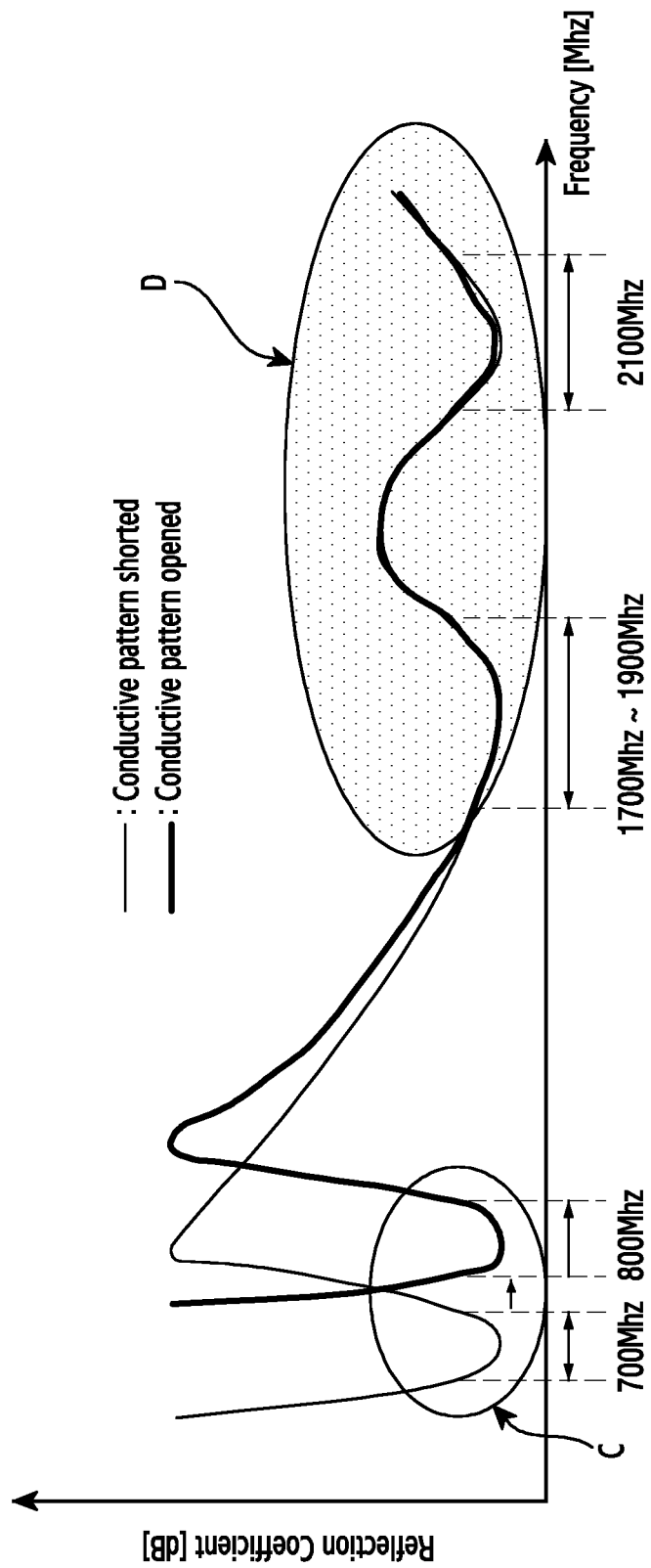
FIG. 5 is a graph illustrating a voltage standing wave ratio (VSWR) during a frequency shift according to switching of a conductive pattern according to an embodiment of the present disclosure.

FIG. 5 is a graph illustrating a VSWR during a frequency shift according to a switching of a conductive pattern according to an embodiment of the present disclosure.

Referring to FIG. 5, the operating frequency band is shifted in the low band region (C region) according to opening and shorting by the switching circuit, but the operating frequency band is not shifted in the mid band region (D region).

Figure 6A:
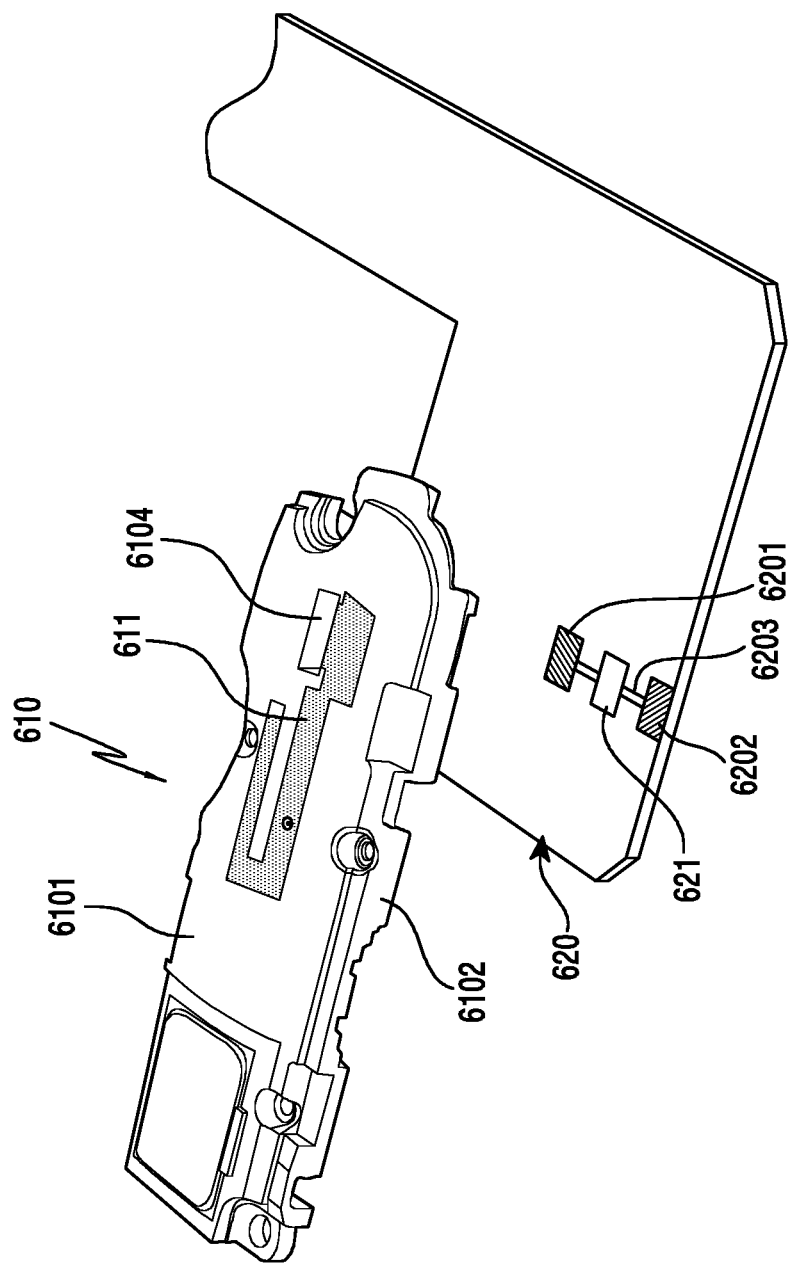
FIGS. 6A and 6B illustrate a conductive pattern disposed on an upper surface of a carrier according to an embodiment of the present disclosure.
Figure 6B:
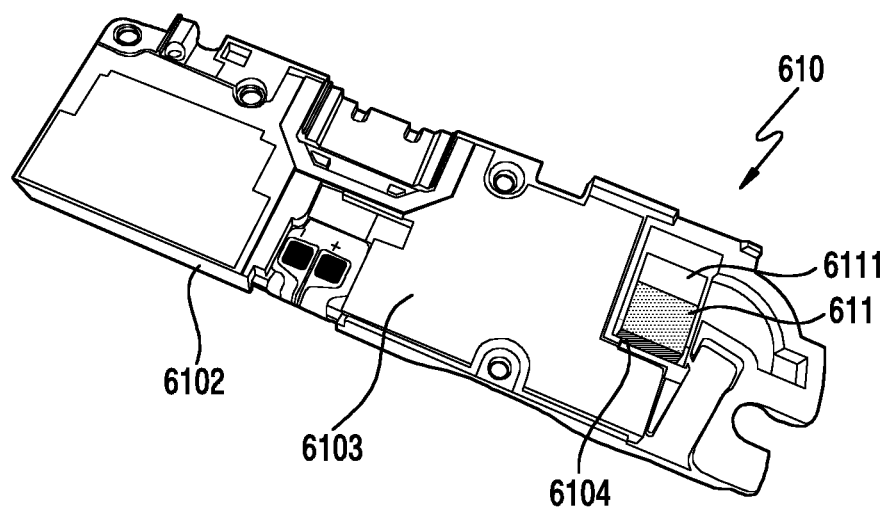

FIGS. 6A and 6B illustrate a conductive pattern according to an embodiment of the present disclosure. For example, the conductive pattern illustrated in FIGS. 6A and 6B may be utilized as the conductive pattern 420 formed on the substrate 400 as illustrated in FIG. 4.

Referring to FIGS. 6A and 6B, a conductive pattern 611 is disposed on a carrier 610 of a dielectric material, which is mounted on a certain region of a substrate 620. The carrier 610 may include a dedicated carrier for the conductive pattern 611. The carrier 610 may include a component mounting carrier to which at least one electronic component (e.g., a speaker module, a microphone module, or a vibrator module) of the electronic device is applied.

The carrier 610 includes a first surface 6101 (e.g., an upper surface) on which the conductive pattern 611 is disposed, a second surface 6103 (e.g., a lower surface), which is disposed opposite to the first surface 6101, and a side surface 6102 formed along a border between the first surface 6101 and the second surface 6103 to define a height.

The conductive pattern 611 is disposed on the first surface 6101 in such a manner that its connection end 6111 is exposed to the second surface 6103 through a penetrating hole 6104 penetrating from the first surface 6101 to the second surface 6103. Alternatively, the conductive pattern 611 may bypass the side surface 6102 from the first surface 6101 and may extend to the second surface 6103. The conductive pattern 611 may be formed on the carrier 610 in a laser direct structuring (LDS) method or a direct printing antenna (DPA) method. The conductive pattern 611 may also be formed by attaching a metal plate of a predetermined shape or a flexible PCB (FPCB) to the carrier by direct bonding, soldering, taping, clipping, fusing, etc.

The substrate 620 includes a pattern connection pad 6201, which is physically in contact with the connection end 6111 of the conductive pattern 611 exposed to the second surface 6103 of the carrier 610, a connection pad 6202, which is connected with the pattern connection pad 6201 through an electric path 6203 (e.g., a distribution line) and is in contact with the connection piece (e.g., the connection piece 4143 of FIG. 4) of the above-described lower conductive member (e.g., the lower conductive member 414 of FIG. 4), and a switching circuit 621, which is disposed on the electric path 6203 and is controlled by the electronic device. The connection end 6111 of the conductive pattern 611 exposed to the second surface 6103 of the carrier 610 may be electrically connected with the pattern connection pad 6201 of the substrate 620 simply by mounting the carrier 610 on at least a certain region of the substrate 620. Alternatively, the connection end 6111 and the pattern connection pad 6201 may be electrically connected with each other by a separate electric connection member (e.g., a C clip).

Figure 7:
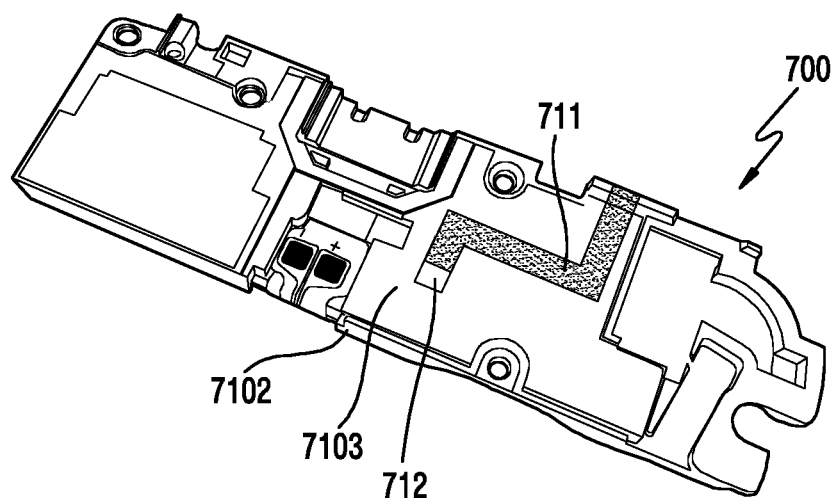
FIG. 7 illustrates a conductive pattern disposed on a lower surface of a carrier according to an embodiment of the present disclosure.

FIG. 7 illustrates a conductive pattern disposed on a lower surface of a carrier according to an embodiment of the present disclosure.

Referring to FIG. 7, a conductive pattern 711 is directly disposed on a second surface 7103 (e.g., a lower surface) of the carrier 700. A first surface (e.g., the first surface 6101 of FIG. 6A) may be utilized as a disposal space of another antenna emitter or a mounting space of at least one electronic component. The conductive pattern 711 may be formed on a side surface 7102 of the carrier 700 or may be formed, extending from the side surface 7102 to the second surface 7103. The conductive pattern 711 may be formed in the LDS method or the DPA method, such that its connection end 712 is exposed to the second surface 7103 of the carrier 700. The conductive pattern 711 may be formed by attaching a metal plate of a predetermined shape and an FPCB to the carrier by direct bonding, soldering, taping, clipping, fusing, etc. Accordingly, the carrier 700 may be mounted on the substrate in the same method as described in FIGS. 6A and 6B.

Any of the functions and steps provided in the figures may be implemented in hardware, software or a combination of both and may be performed in whole or in part within the programmed instructions of a computer.

Alternatively, a conductive pattern may be formed of a nonmetal material and may be disposed in a structure (e.g., a housing, a bracket, etc.) used in the electronic device using the above-described conductive pattern forming method.

An antenna according to an embodiment of the present disclosure is configured not to be interfered in the mid band and/or high band, even when a frequency is shifted in the low band, such that degradation of radiation performance can be prevented in advance and reliability of the electronic device can be enhanced.

According to various embodiments, there is provided an electronic device including a housing; a conductive member which forms a part of the housing or is disposed on at least a part of an inside of the housing; a communication circuit electrically connected to a first region of the conductive member; a conductive pattern electrically connected to a second region of the conductive member; and a switching circuit which is disposed on an electric path between the conductive pattern and the conductive member to selectively and electrically connect the conductive pattern to the conductive member.

According to various embodiments, the conductive member may operate as a multi-band antenna emitter by the communication circuit, and may be electrically connected with the conductive pattern out of a range of an electric length of the conductive member.

According to various embodiments, the electric length may include λ/4.

According to various embodiments, the conductive member may operate as a multi-band antenna emitter operating in a low band and a mid band and/or a high band.

According to various embodiments, the conductive member may have an operating frequency of the low band shifted from a first low band frequency band to a second low band frequency band by a switching operation of the switching circuit.

According to various embodiments, the conductive member may operate in the first low band frequency band when being shorted with the conductive pattern, and may operate in the second low band frequency band which is relatively higher than the first low band frequency band when being opened with the conductive pattern.

According to various embodiments, the first low band frequency band may include a band of 700 MHz, and the second low band frequency band may include a band of 800 MHz.

According to various embodiments, the conductive pattern may be formed on a substrate disposed inside the housing.

According to various embodiments, the conductive pattern may be disposed on a carrier made of a dielectric material and disposed inside the housing.

According to various embodiments, the conductive pattern may be disposed on at least one of an upper surface, a side surface, or a lower surface of the carrier.

According to various embodiments, the conductive pattern may be disposed to have its connection end exposed to a lower surface in such a way that the connection end penetrates from an upper surface to a lower surface of the carrier.

According to various embodiments, the conductive pattern may be disposed on a side surface from an upper surface of the carrier or may be disposed by bypassing a side surface from an upper surface of the carrier to a lower surface.

According to various embodiments, the carrier may include a component mounting carrier for accommodating at least one electronic component applied to the electronic device.

According to various embodiments, the at least one electronic component may include a speaker module, a microphone module, a vibrator module, or various sensor modules.

According to various embodiments, the conductive pattern may be formed on the carrier by an LDS method or a DPA method, or may be formed by attaching a metal plate of a predetermined shape or an FPCB to the carrier by at least one of direct bonding, soldering, taping, clipping, or fusing.

According to various embodiments, the switching circuit may include an SPST or an SPDT which is controlled by the electronic device.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
   a housing;
   a conductive member forming a part of the housing, wherein the conductive member is configured to be utilized as a multi-band antenna emitter, and the conductive member operates at a low band, and at a mid band and/or high band;
   a communication circuit electrically connected to a first location of the conductive member;
   a conductive pattern disposed on an inside of the housing; and
   a switching circuit disposed on a second location of the conductive member, wherein the switching circuit is switched to electrically connect and disconnect the conductive pattern to and from the conductive member,
   wherein when the switching circuit is opened, the conductive member operates at a first frequency band higher than a second frequency band, the first frequency band and the second frequency band being included in the low band,
   wherein when the switching circuit is closed, the conductive member and the conductive pattern operate at the second frequency band, and
   wherein the second location is outside of an electric length associated with the mid band and/or high band, the electronic length being extended from the first location.

2. The electronic device of claim 1, wherein the electric length comprises λ/4, where λ indicates wavelength.

3. The electronic device of claim 1, wherein the first location is one end of the conductive member, and the second location is the other end of the conductive member.

4. The electronic device of claim 1, wherein the first frequency band comprises a 700 MHz band, and
   wherein the second frequency band comprises an 800 MHz band.

5. The electronic device of claim 1, wherein the conductive pattern is formed on a substrate disposed inside the housing.

6. The electronic device of claim 1, wherein the conductive pattern is disposed on a carrier including a dielectric material and disposed inside the housing.

7. The electronic device of claim 6, wherein the conductive pattern is disposed on at least one of an upper surface, a side surface, and a lower surface of the carrier.

8. The electronic device of claim 6, wherein the conductive pattern includes a connection end that penetrates from an upper surface to a lower surface of the carrier.

9. The electronic device of claim 6, wherein the conductive pattern is disposed on a side surface from an upper surface of the carrier or is disposed by bypassing the side surface from the upper surface of the carrier to a lower surface.

10. The electronic device of claim 6, wherein the carrier comprises a component mounting carrier for accommodating an electronic component of the electronic device.

11. The electronic device of claim 10, wherein the electronic component comprises at least one of:
    a speaker module;
    a microphone module;
    a vibrator module; and
    a sensor module.

12. The electronic device of claim 6, wherein the conductive pattern is formed on the carrier by a laser direct structuring (LDS) method or a direct printing antenna (DPA) method.

13. The electronic device of claim 6, wherein the conductive pattern is formed by attaching a metal plate of a predetermined shape or a flexible printed circuit (FPCB) to the carrier by at least one of direct bonding, soldering, taping, clipping, and fusing.

14. The electronic device of claim 1, wherein the switching circuit comprises at least one of a single pole, single throw (SPST) switch and a single pole, double throw (SPDT) switch.

* * * * *